United States Patent
Herrmann

[15] 3,678,262
[45] July 18, 1972

[54] INFRARED GAS ANALYZER

[72] Inventor: Pierre Herrmann, Hauts de Seine, France
[73] Assignee: Compteurs Schlumberger, Montrouge, France
[22] Filed: April 30, 1971
[21] Appl. No.: 138,876

[30]      Foreign Application Priority Data

July 21, 1970   France..................................7026755

[52] U.S. Cl. ....................................250/43.5 R, 250/83.3 R
[51] Int. Cl. ..............................................................G01n 21/26
[58] Field of Search ............................................250/43.5 R

[56]               References Cited

UNITED STATES PATENTS 3,454,760   7/1969   Kowert............................250/43.5 R
3,281,596   10/1966  Williston..........................250/43.5 R
3,560,738   2/1971   Strange...........................250/43.5 R Primary Examiner—Archie R. Borchelt
Assistant Examiner—C. E. Church
Attorney—William R. Sherman, Stewart F. Moore and Jerry M. Presson

[57]                ABSTRACT

The analyzer comprises, in succession, an infrared ray source, a modulator, an analysis chamber containing the mixture of gasses, and a detector together with associated electronic circuits for processing the electric signals delivered by the detector. The modulator periodically interposes in the path of the radiation of gaseous reference filter which absorbs the characteristic lines of the particular gas to be analyzed, and a measurement filter which does not absorb these lines. The filters are separated from each other by two identical base filters comprising an element permitting grey transmission slightly lower than the average transmission of the reference filter so that the detector delivers successively a measurement signal and a reference signal respectively defined with respect to a common level determined by the base filters. The electronic processing circuits comprise means for amplifying and demultiplexing the signals and means for establishing and reading out the quotient of the measurement signal and the reference signal. This quotient is representative of only the concentration sought.

18 Claims, 3 Drawing Figures

INVENTOR.
Pierre Herrmann

3,678,262

INFRARED GAS ANALYZER

This invention relates to gas analyzers of the infrared ray absorption type, that is to say to devices comprising in succession a source emitting infrared rays, an analysis chamber containing the mixture to be analyzed a radiation detector, electronic amplification and processing circuits and an indicator. Means for selecting the specific wave lengths of a given gas are moreover provided in association with one or the other of the first three elements of the above succession so that the signal delivered by the detector is representative of the concentration of the gas.

Various gas analysis devices of the infrared ray absorption type exist already on the market. They are used in medical applications (checking respiration), and for the surveillance of work atmospheres, the checking of exhaust gasses of automobiles and the regulation of particular industrial processes.

One of these devices is described by D. Hill and R. Stone in "Journal of Scientific Instruments" of 1964, Volume 41. The specific wave lengths of the gas sought are in this case selected by means of two positive interference filters whose transmission bands are respectively centered on and outside the principal group of the absorption lines proper to the gas sought. These filters are mounted on a modulator disc turning at constant speed and disposed between the source emitting the infrared rays and the analysis chamber, the detector used being a simple photoelectric cell. In these conditions, the infrared beam is modulated by the periodic interposition of a measurement filter and a reference filter, so that the detection cell delivers successively a measurement signal and a reference signal, both of which are defined with respect to the potential of obscurity of the cell. The associated electronic circuits ensure the amplification and the demultiplexing of the signals. Moreover, they stabilize the amplitude of the reference signal by means of a negative feedback loop comprising a variable gain amplifier common to the two signals. In these conditions, the difference between the amplified and demultiplexed measurement and reference signals is a measure of the concentration sought, which is independent of variations of intensity of the infrared beam.

Such analyzers, due to the positive transmission filters used, have the disadvantage of lacking in selectivity and in sensitivity.

Another gas analyzer device is described in U.S. Pat. No. 2.534.657 granted to Ellis E. Bray. In this apparatus a beam of infrared rays traverses a measurement chamber containing the mixture of gasses to be analyzed and this beam is then modulated by the periodic interposition of a capsule containing the gas sought - this capsule constituting a negative gaseous reference filter absorbing selectively the characteristic lines of the gas - and then of a measurement sector transparent to infrared, the beam thus modulated being applied to a non-selective detection cell. The signal furnished by the cell is an alternating signal which, after amplification and rectification, is recorded to furnish the gas concentration sought.

Such an analyzer due to the presence of the gaseous reference filter, is more sensitive and more selective than the preceding one. Indeed, due to the gaseous reference filter the measurement englobes the totality of the lines specific to the gas sought and not only the group of lines selected that the interference filter allows to pass through, so that the sensitivity of this apparatus is as much as 20 times greater than the sensitivity of the preceding one. Moreover, due to the gaseous reference filter, the specific lines of a parasite gas which might be intercalated between the lines of the gas sought (as is the case for water vapor when carbonic acid is the gas sought), no longer intervene in the measurement, which is contrary to what happens in the case of the interference filter type analyzer, and this greatly increases the selectivity of the apparatus. By contrast, due to the fact that the measurement signal generated is a single signal, constituted by the difference between the potentials alternately taken by the detection cell when the gaseous reference filter and the measurement filter are respectively placed in the path of the beam, stability of the measurement is not obtained. For it is impossible to render such a signal independant of variations of the power emitted, of dirtying of the windows and of the sensitivity of the cell as in the case of the preceding analyzer of the interference filter type, in which a distinct measurement signal and a distinct reference signal were alternately produced, which it was easy to process in order to obtain total stability of the measurement. Moreover, the precision of the second apparatus was lower than that of the first apparatus due to the creation of transition parasitics which do not appear with interference transmission filters since in this case the two useful signals (measurement and reference) defined with respect to the potential of obscurity of the cell, are the only ones produced. On the contrary, in the case of the gaseous filter absorption analyzer of Ellis Bray, the useful signal constituted by the difference between the potentials alternately taken by the cell due to the alternate interposition of the measurement and reference filters in the infrared beam was accompanyed by transition parasitics of these filters, which degraded the quality of the measurement. Indeed, since the chamber which contained the reference gas was directly cut in the mass of a plate transparent to infrared, the edges of that chamber were refractors, which was translated by the creation of large parasitic signals (of relatively short duration but of peak amplitude which could reach as much as 100 times that of the useful signal) which affected seriously the precision of the measurement in spite of the application of elementary precautions such as clipping and filtering.

An object of this invention is to provide infrared ray absorption gas analyzers which associate the qualities of selectivity and sensitivity of the analyzers of the gaseous reference filter type with the qualities of stability and precision of the analyzers of the type using interference measurement and reference filters, and which nevertheless do not have the disadvantages of one or the other of these two prior apparatuses cited above.

More particularly, a first object of the invention is to provide an analyzer for the measurement of the concentration of a particular gas contained in a mixture.

According to the invention, a device for obtaining by absorption of infrared rays, the concentration of a given gas present in a mixture of gasses to be analyzer of the type comprising a source of infrared rays, an analysis chamber containing the mixture, a modulator ensuring the periodic interposition in the path of these rays of a gaseous reference filter absorbing the characteristic lines of the given gas and of a measurement filter which does not absorb these lines, a non-selective detection cell and electronic circuits for processing the electric signals delivered by the cell, is characterized on the one hand in that the filters of the modulator are separated from one another by two identical base filters comprising an element permitting grey transmission slightly lower than the average transmission of the reference filter, so that the cell delivers successively a measurement signal and a reference signal, respectively defined with respect to a common level determined by the base filters, and on the other hand, in that the electronic processing circuits comprise means for amplifying and for demultiplexing the signals and means for establishing and reading out the quotient of the measurement signal and the reference signal, this quotient being representative of only the concentration sought.

According to a complementary characteristic of the invention, the base filters, in addition to an element permitting grey transmission, comprise a gaseous filter identical to the reference filter.

Due to the presence of the base filters, a perfectly defined rest potential exists for the cell between the potential that it takes when the gaseous reference filter and the measurement filter are respectively intercalated, so that two distinct signals, respectively a measurement signal and a reference signal, are successively generated which it is easy to isolate by demultiplexing. The quotient of these two signals adds, to the characteristics of selectivity and sensitivity inherent in analyzers of the gaseous reference filter type, a characteristic of stability with respect to variations of the average energy received by the cell and of the sensitivity of this cell, which is the contribution of the quotient of these measurement and reference signals.

According to a complementary characteristic of the present invention, a modulator of such an analyzer is characterized in that it comprises a sealed annular chamber containing the particular gas sought, this chamber being constituted between two parallel superimposed plates cut in the form of an annulus from a material transparent to infrared, and then polished, this chamber being divided into four sectors which are preferably equal, the first sector, occupied by a piece having polished parallel faces and which is cut in that material, constitutes the measurement filter, the second and third sectors, diametrically opposed, comprise on one of the plates spots opaque to infrared and constitute the base filters, and the fourth sector is free and constitutes the reference filter.

According to another complementary characteristic of the invention, the radial edges of the transparent pieces having parallel faces and disposed in the annular chambers of the modulator are perpendicular to those faces and are carefully polished, a small angular sector without spots being moreover provided between these radial edges and the edges of the base sector contiguous with the radial edges.

According to another complementary characteristic of the invention, the concentric walls of the annular chambers of the modulator comprise at least one circular or helicoidal groove occupying a width approximately equal to the height of the chambers, with preferably a black mat coating applied on these walls.

Due to the first feature mentioned above, the parasitics produced at the moment of the transition from a base filter to a measurement or a reference filter are practically eliminated. Due to the second feature mentioned above, the parasite reflexions of the infrared beam are eliminated. These two features used together considerably increase the precision of the measurement.

A second object of the invention is to provide an apparatus capable of measuring the concentrations of several gasses contained in a mixture.

An analyzer of this type has been described in French Pat. No. 1,028,790 grated to The Distillers Company.

In that analyzer, an infrared beam traversing the measurement chamber is divided into two equal parts which are alternately applied, by a rotating mask type modulator, to two gaseous filters which are respectively a reference filter and a measurement filter, and then to a non-selective detection cell. The gaseous reference filter is a capsule containing the gas sought and the gaseous measurement filter a capsule containing a gas insensitive to the infrared radiation. Furthermore, a common elimination filter constituted by a capsule containing the gasses which might be found in the mixture, except for the gas sought at that instant, can be disposed in the path of the beam. The commutation of the modulation filter and the elimination filter, as a function of the particular gas sought, is done by hand by the operator.

With such a device, the alternating differential signal delivered by the cell is, due to the use of an elimination filter, relatively insensitive to gasses other than the gas sought, and due to this fact, the apparatus is very selective. Moreover, it permits the analysis of the concentrations of several gasses contained in the mixture. Such a multiple analysis is however discontinuous and requires the intervention of the operator, which is a disadvantage in its use. Moreover, such a device has numerous disadvantages. First of all, it is practically impossible in the long term to maintain equal the two parts of the infrared beam alternately applied to the reference and measurement filters. It should be born in mind that the useful variations of energy caused by the selective absorption of the characteristic lines of a given gas represent at the most two to three parts per thousand of the total energy of the beam. In these conditions, the amplitude of the useful variations is so small that any differential variation, either of the energies of the two parts of the beam or of the areas of the openings of the modulator mask, is determining for the quality and the precision of the measurement. Moreover, the parasites of transition created by the modulator while the reference filter is substituted for the measurement filter are so large that in spite of the precautions taken to minimize the final importance of these parasitics, such disturbances considerably decrease the precision of the measurement effected.

The second object of the invention is consequently to provide a device for measuring simultaneously and automatically the concentrations of several given gasses contained in a mixture in conditions of sensitivity, selectivity, stability and precision identical to those obtained above with the mono-gas analyzer according to the first object of the invention.

According to the aspect of the present invention, a device for obtaining by absorption of infrared rays the respective concentrations of a number N or given gasses present in a mixture to be analyzed is characterized in that it comprises in combination a source of infrared rays, an analysis chamber containing the mixture, a modulator ensuring the periodic interposition of a gaseous reference filter absorbing the totality of the characteristic lines of the N given gasses and of N gaseous measurement filters corresponding each to a particular given gas and absorbing respectively the characteristic lines of all given gasses other than the characteristic lines of that particular gas, these (N + 1) gaseous filters being separated from one another by (N + 1) identical base filters comprising an element permitting grey transmission slightly lower than the average transmission of the reference filter, a non-selective detection cell delivering successively N measurement signals and a reference signal respectively defined with respect to a common base level, electronic circuits for processing these signals comprising means for amplifying and then demultiplexing the signals and means for establishing and reading out the quotients of the N measurement signals and the reference signal, these quotients being respectively representative of only the concentrations sought.

According to a complementary characteristic of the present invention, these base filters comprise, in addition to the grey transmission element, a gaseous filter identical to the reference filter.

According to another complementary characteristic of the present invention, the modulator of a device intended for analysis the concentration of a number N of given gasses present in a mixture is characterized in that it is constituted by N sealed annular chambers containing respectively the N gasses sought, these N chambers being constituted between (N + 1) parallel superimposed plates, cut in the form of an annulus in a material transparent to infrared and then polished, the ensemble being divided in 2(N + 1) sectors which are preferably equal and constitute respectively the N measurement filters, the reference filter and the (N + 1) base filters, the N measurement filters comprising N pieces having polished parallel faces which are cut in the material and respectively disposed in the N chambers, the (N + 1) base filters comprising on a given plate (N + 1) sectors covered by spots opaque to infrared, and the reference filter being constituted by the free sector.

Means identical to those described above are moreover provided for eliminating the parasite reflexions of the beam and minimizing the parasitics of commutation of the filters.

Due to these features, the measurements of concentrations of different gasses sought have, in addition to characteristics of selectivity and sensitivity proper to the gas analyzers of the gaseous reference filter type, characteristics of stability, precision and automation which it has not hitherto been possible to associate.

Indeed, suppose it is desired to measure the absorptions $a$, $b$, $c$ respectively caused by the concentrations of three particular given gasses present in a mixture. In the incident energy $E$, the partial energies of the specific lines of each of the three gasses sought are in order $A$, $B$ and $C$, that of the parasitic gas which is also present (of concentration d) being D, which energies each equal about 1 percent of E. The three gaseous measurement filters absorb respectively the partial energies $(A+B)$, $(A+C)$ and $(B+C)$ and the reference filter the partial energies $(A+B+C)$. The grey base filters intercalated between the above gaseous filters have a coefficient of transmission $t$ of about 0.90 (transmission slightly lower than the average transmission of the gaseous reference filter, namely $E-A-B-C \neq \neq 0.97\ E$).

As a function of the energies succesively received and of the coefficient of sensitivity $K$ of the cell, this cell produces three unprocessed measurement signals $M_1$, $M_2$ and $M_3$, an unprocessed reference signal $M_R$ and four identical base signals $M_B$, these signals being defined with respect to the potential of obscurity of the cell:

$$M_1 = K(E-A-B-cC-dD)$$
$$M_2 = K(E-A-bB-C-dD)$$
$$M_3 = K(E-aA-B-C-dD)$$
$$M_R = K(E-A-B-C-dD)$$
$$M_B = Kt(E-A-B-C-dD)$$

In practice however the following differential measurement and reference signals are directly produced by the detection cell:

$$S_1 = M_1 - M_B = (E-A-B-C-dD)(1-t).K + (1-c)\ C.K$$
$$S_2 = M_2 - M_B = (E-A-B-C-dD)(1-t).K + (1-b)\ B.K$$
$$S_3 = M_3 - M_B = (E-A-B-C-dD)(1-t).K + (1-a)\ A.K$$
$$S_R = M_R - M_B = (E-A-B-C-dD)(1-t).K$$

These differential signals succeed one another continuously to the input of the associated electronic circuits. They have amplitudes of about the same magnitude and include practically no parasitics caused by commutation. The associated electronic circuits can consequently process them in particularly satisfactory conditions of linearity, thus inproving the precision of the measurement.

By calculating, after amplification and demultiplexing, the quotients of the above differential measurement signals $S_1$, $S_2$ and $S_3$ and the common differential reference signal $S_R$ — which is representative of the energy emitted - one obtains simultaneously three perfectly corrected measurement signals representative of the concentrations sought.

Thus, $X_1 = S_3/S_R = 1 + A(1-a)/(E-A-B-C-dD)(1-t)$

It is the same for $X_2$ and $X_3$. In these expressions, the denominator, in addition to the term $(1-t) = 0.10$ which is fixed for a given modulator, contains an approximatively constant term $(E-A-B-C)$ which is a function of the energy emitted and which, in the example given, equals $0.97\ E$, and a variable term $dD$. The amplitude of this latter term is determined by the instantaneous value $d$ of the concentration of the parasite gas. In practice, the value $d$ reaches the most 10 percent, which in the example gives for the above variable term a maximum value of $10^{-3}.E$. This value is negligeable with respect to $0.97\ E$. The quotient of the differential measurement signals and the differential common reference signal generated according to the present invention is thus particularly useful. On the one hand, such a quotient gets rid of the effects of the variations of the amplitude $E$ of the energy emitted, of the dirtying of the windows and walls of the analysis chamber and of the sensitivity of the detection cell, which variations can together easily reach 20 percent if precautions are not taken. On the other hand, this same quotient renders the measurement effected insensitive to the concentrations of all the other infrared-absorbing gasses of the mixture, and this is accomplished whatever be the values of these concentrations. In this manner there is combined in the same gas analyzer particularly remarkable characteristics of selectivity, sensitivity, stability precision and automation (in the case of multigas analyzers) which it has hitherto been impossible to associate to such a degree.

In the case in which the base filter comprises an element permitting grey transmission, but no gaseous reference filter, the above signals are slightly modified, and, in the case of the first gas, the corrected measurement signal would be:

$$X_1 = S_3/S_R = 1 + A(1-a)/[E(1-t) - A - B - C + t(Aa + Bb + Cc) - Dd(1-t)]$$

As can be seen, the denominator of the above expression, instead of a single variable term, contains four of them. It is known that the amplitudes of the partial energies $A$, $B$, $C$ AND $D$ equal at most $10^{-2}.E$; in these conditions as long as the absorption coefficients a, b, c and d are small (for example less than 5 percent) the measurement - although less sensitive and less selective - will nevertheless differ little from the measurement that was obtained with base filters comprising a grey transmission element and a gaseous reference filter.

In practice however a modulator having base filters including the reference filter will be used in preference to a modulator having a base filter not including a reference filter, for, in addition to the better quality of the measurement thus effected, such a modulator is much easier to make and hence much less expensive.

The characteristics and advantages of the present invention will appear more clearly from the following description given solely by way of non limiting example with reference to the accompanying drawings in which.

Figure 1:
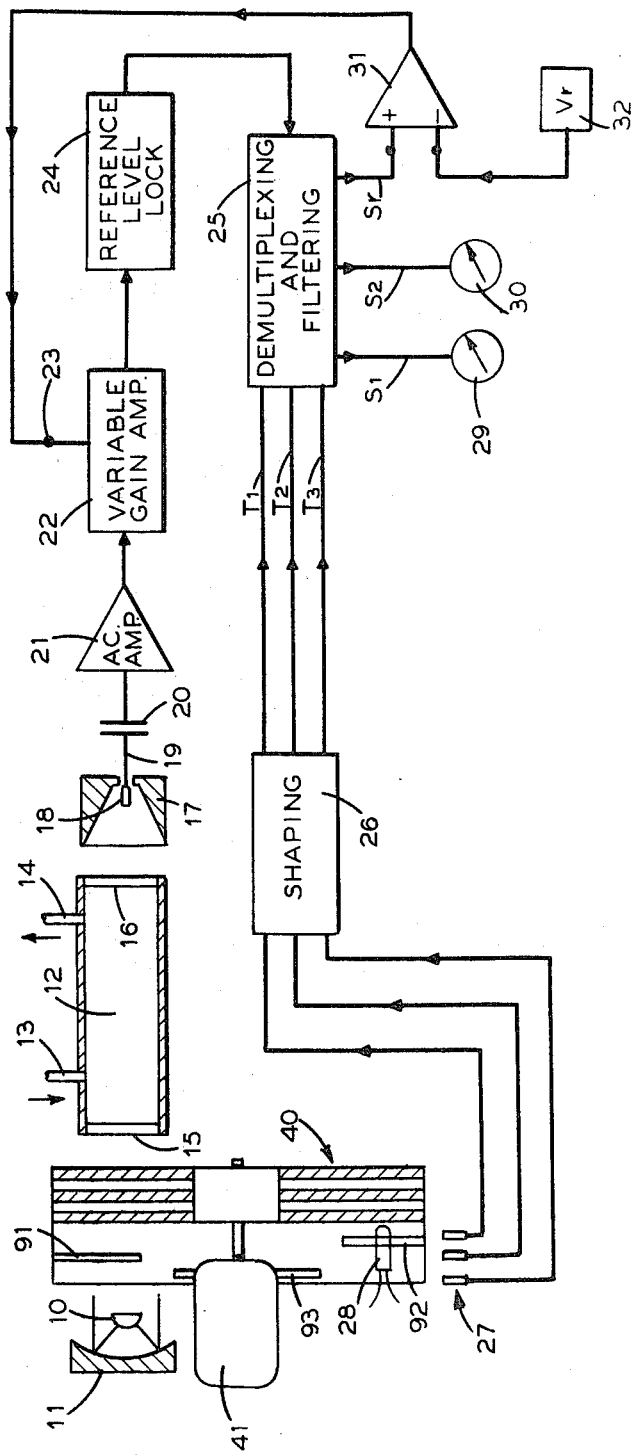
FIG. 1 is a general schematic diagram of one embodiment of a gas analysis device according to the invention.

According to FIG. 1, which shows a device for analyzing the concentrations of two gasses $A$ and $B$, a source of infrared 10 constituted for example by a nickel-chromium filament brought up to red heat by the passage of an electric current whose intensity can be regulated, is placed at the focus of a parabolic mirror 11. Facing the mirror 11 is disposed an analysis chamber 12 of cylindrical shape (for example 1 cm in diameter and 3 cm long) comprising an inlet 13 and an outlet 14 for the gas mixture to be analyzed. Two windows transparent to infrared 15 and 16 (made of calcium fluoride for example) are fixed at the ends of the analysis chamber 12. Following the outlet window 16 is disposed an optical concentration cone 17 at the summit of which is placed a non-selective cell 18 sensitive to infrared (for example an indium antimonide photoconductive cell) this cell being stabilized with regard to temperature by a thermal regulation device (not shown). Between the emitter 10–11 and the chamber 12 is disposed a modulator 40 comprising two gaseous filters containing respectively the gasses $A$ and $B$, and driven at 25 revolutions per second by a motor 41. A detailed description of the modulator 40 will be given hereafter with reference to FIGS. 2 and 3.

The cell 18 is connected by a conductor 19 to a coupling capacitor 20 connected to the input of an AC amplifier 21 itself followed by an amplifier 22 whose gain is variable under the action of a control voltage applied to a terminal 23. The output of the amplifier 23 is applied to a reference level locking circuit 24 and then to a demultiplexing and filtering circuit 25 receiving three synchronization signals $T_1$, $T_2$, $T_3$. These signals are furnished by a group of three shaping circuits 26 whose three inputs are connected to a group of three photodiodes 27 co-operating with a lamp 28 and with three synchronization slots 91 – 93– 95 offset by 120°, formed in a skirt 94 comprised by the modulator 40.

The demultiplexing and filtering stage 24 delivers two measurement signals $S_1$ and $S_2$ respectively applied to two measurement indicators 29 and 30 (for example of the dial and needle type), and a reference signal $S_R$. The reference signal $S_R$ and a reference voltage $V_R$ furnished by a source 32 are applied to the inputs of a differential amplifier 31 whose output is connected to the gain-control terminal 23 of the variable gain amplifier 22.

Due to this feature, only the variations of potential undergone by the cell 18 are transmitted by the capacitor 20 to the amplifiers 21 and 22. At the output of the reference level locking circuit 24, multiplexed signals (pulses modulated in amplitude) $S_1$, $S_2$ and $S_R$ appear distinct one from the others, these signals being defined with resepct to a common base level fixed by the locking circuit 24. At the three outputs of the demultiplexing and filtering circuit 25, the three signals $S_1$, $S_2$ and $S_R$ appear respectively in the form of DC voltages. The amplitude regulation loop which comprises the amplifiers 31 and 22 has the effect of maintaining $S_R = V_R$, so that the signals $S_1$ and $S_2$ respectively applied to the measurement indicators 29 and 30 are in fact directly proportional to the quotients $S_1/S_R$ and $S_2/S_R$ since the gain of the amplifier 22 through which the signals $S_1$ and $S_2$ pass is constantly modified so that $S_R = V_R$. This manner of calculating the quotients $S_1/S_R$ and $S_2/S_R$ leads to a particularly simple and cheap realization.

Figure 2:
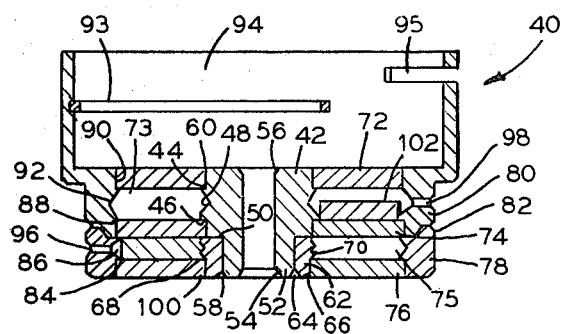
FIG. 2 is an axial section of the modulator according to the invention.

According to FIG. 2, which shows an axial section of the modulator 40, this modulator comprises a hub 42 on the exterior wall of which are cut two circular shoulders of the same diameter 44 and 46 separated one from the other by a circular groove in the form of a V, 48, and a circular shoulder 50 of smaller diameter than the two preceding ones, formed in the base of a collar 52. At the ends of the hub 42, the interior edges 54 and 56 and the exterior edges 58 and 60 of this hub are beveled. Bearing against the shoulder 50 is a ring 62 which can slide on the collar 52, this ring 62 having the same height as the collar 52 and comprising on its external edges bevels 64 and 66. On the periphery of the ring 62 are cut a circular shoulder 68 and a V groove 70. Three annuli having parallel faces 72, 74 and 76 made of calcium fluoride (or any other material transparent to infrared) and polished with care respectively mounted against the shoulders 44, 46 and 68, these annuli being maintained in place by two rims 78 and 80 which fit together at 82, so as to constitute two chambers 73 and 75. The rim 78 comprises an interior shoulder 84 and a V groove 86, respectively facing the shoulder 68 and the groove 70. Similarly the rim 80 comprises two shoulders 88 and 90 respectively facing the shoulders 46 and 44 and a V groove 92 facing the groove 48. To the rim 80 is fixed the skirt 94 in which are formed three synchronization slots such as 93 and 95. Furthermore two filling holes 96 and 98 are respectively provided in the rims 78 and 80. Two measurement sectors 100 and 102 of calcium fluoride and having a 60° opening are respectively disposed at 120° one from the other in the chambers 73 and 75. These sectors 100 and 102 have parallel faces and edges perpendicular to those faces; these faces and edges have been optically polished.

To assemble the various elements of the modulator, one proceeds in the following manner, making use of a cylindrical jig on which the skirt 94 can be slid without friction and which comprises a central shaft of diameter corresponding to the central hole of the hub 42. First of all the annulus 72 is placed on the upper face or plate of the jig around its central shaft. Then the skirt 94 is slid on to the cylinder of the jig and the hub 42 is slid on to the shaft of this jig. In this manner the annulus 72 bears against the shoulders 44 and 90 respectively formed in the hub 42 and the rim 80. Then the sector 102 is disposed between the rim 80 and the hub 42 (if necessary with the aid of a moveable insert) at a position previously marked on the plate of the jig. Then the sector 102 is glued to the rim 80 and to the hub 42, the insert being removed. Then the annulus 74 is put in place on the shoulders formed in the hub 42 and the rim 80. Then the rim 78 and the ring 62 are put in place so as to pinch the annulus 74 between their shoulders and those of the hub 42 and of the rim 80. The sector 100 is then put in place on the annulus 74 at another position marked on the plate of the jig. Then the annulus 76 is placed against the shoulder 68 of the ring 62 and against the shoulder 84 of the rim 78.

Before assembling these various pieces, a thin thread of glue is put in the hollow of each shoulder and on each edge in contact with another element. Other threads of glue are then disposed in the bevels formed on the contiguous exterior edges of the assembled pieces. The assembly remains clamped until the threads of glue are solidified and make it into an indissociable whole.

It will be noted that in order to make a modulator of the base filters type, but which does not comprise any reference filter, supplementary transparent sectors should be used for occupying the parts of the annular chamber assigned to the base filters. Taking into account the high price of such sectors, it will be understood that a modulator of the base filters type which includes the reference filter is appreciably less expensive than a modulator of the base filter type which does not include the reference filter.

It will furthermore be noted that according to FIG. 2, the thickness of the measurement sector 102 (identical to the sector 100) is considerably less than the height of the annular chamber 73 constituted between the plate 72 and 74. Such a height is chosen in order to decrease the amplitude of the measurement signal furnished by the sector. Such a feature is used when the ratio of the maximum concentrations of the two gasses A and B sought is known. In this manner measurement signals are obtained having the same maximum amplitudes and identical measurement indicators can be used which are provided with dials graduated as a function of the maximum concentrations of the two gasses, even in the case in which the concentrations of the two gasses are very different from each other.

The object of the grooves 48–92 and 70–86 is to eliminate the multiple parasitic reflexions which would be produced on the concentric walls of the annular chamber 73 –75 if, in spite of the mat black coating, these walls were cylindrical. Such parasitic reflexions cause oblique rays which have passed through the two gaseous filters to combine with the parallel rays passing directly through a measurement sector, which introduces an error in the measurement signal which can reach 10 percent of the maximum concentration. Preferably a mat black coating is nevertheless deposited on the surfaces of the grooves in order to increase their effectiveness. As a variant, the grooves, contrary to what it is shown in the Figure, can be multiple and take the form of a screw thread for example.

Figure 3:
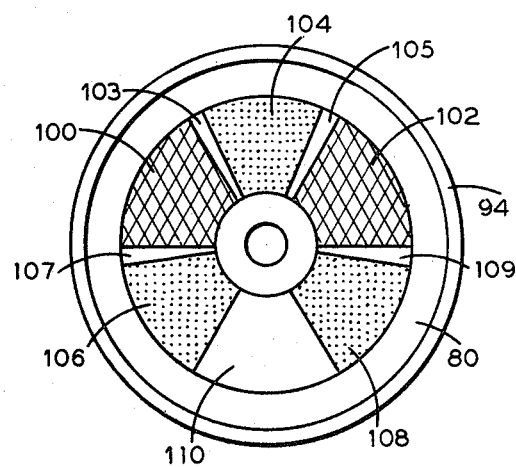
FIG. 3 is a view from above of the modulator of FIG. 2.

According to FIG. 3 which shows a view from above of the modulator 40, the annulus 72 comprises three base sectors 104, 106 and 108 disposed at about 120° from one another, covered with points which are opaque to infrared, regularly disposed. These opaque points - which could be replaced by cross-hatching - are preferably obtained by serigraphy. The density of these points is chosen so that the coefficient of grey transmission of the layer thus formed is slightly lower than the coefficient of the average transmission of the chambers 73 and 75 containing gasses A and B. Intercalated between the base sectors can be seen two measurement sectors 100–102 and the reference sector 110. It will be noted that the base sector 104 has an angular width of 40° and that two sectors 103 –105, of 10° of opening, free of any opaque points, separate respectively the base sector 104 from the measurement sector 100 and 102. Similarly it will be noted that the base sectors 106 and 108 have an angular opening of 50° and that two other sectors 107 and 109 of 10° of opening, free of any opaque points, separate them respectively from the measurement sectors 100 and 102.

The advantage of this feature is to minimize effectively the commutation parasitics of the measurement sectors 100 and 102. Indeed, whatever by the quality of the posishing effected on the radial edges of the transparent pieces 100 and 102, an analysis of the variations of the coefficient of transmission of the modulator comprising rigorously contigus grey sectors and measurement sectors, shows that any transition from a grey sector to a measurement sector, or the reverse, is accompanied by a considerable absorption of the beam which increases until these radial edges arrive at the middle of the beam and then decreases afterwards.

This absoprtion is translated by a non-negligeable error in the measurement signals. By intercalating, between the measurement sectors 100–102 and the base sectors permitting grey transmission 104–106–108, a sector such as 103, 105, 107 or 109 more transparent than these latter ones, the magnitude of the absorption which takes place during the passage of the radial edges of the transparent pieces 100–102 through the beam is considerably decreased. The exact width of these more transparent sectors is determined in an experimental manner. With such a feature the precision of the measurements effected with the apparatus according to the present invention is considerably increased.

The chambers 73 and 77 are filled by the gasses $A$ and $B$ in the following manner. Each chamber comprises a filling hole 96 or 98. A fine tube is welded in each of these holes. Through this filling tube a vacuum is first of all created in the chamber and then it is filled with gas $A$ or $B$ and a vacuum is once again created. This operation is repeated two or three times in order to be sure that practically all the molecules of gasses other than $A$ or $B$ absorbed by the walls of the chamber have been carried away by these rincing operations. Then the filling tubes are crushed, sealed and cut to a convenient length.

The relative positions of the synchronization slots 91, 93, 95 and of the sectors 100, 102 and 110 have not been specified. In practice, the slot 91 embraces the measurement sector 100 and an appreciable part (20 percent for example) of the base sectors 104 – 106 contiguous to the sector 100. Similarly, the slot 93 embraces the measurement sector 102 and an appreciable part of the base sector 104 – 108 contiguous with the sector 102. Similarly again, the slot 95 embraces the reference sector 110 and an appreciable part of the base sectors 108 and 106 contiguous to the sector 110. In this manner, the demultiplexing of the measurement signals $S_1 - S_2$ and of the reference signal $S_R$ respectively generated by the cell when the sectors 100, 102 and 110 are interposed in the path of the infrared beam, takes place in the best conditions.

The invention is not limited to the device described hereabove. In the case for example in which the concentration of a third gas is also sought, the modulator according to the present invention would comprise eight sectors and a third chamber containing the third gas, a second ring for the hub, and possibly, a third rim permitting the assembly of the new elements (transparent sector and annulus) of such a device. Needless to say, a fourth synchronizations slot and a fourth photodiode would be provided, and the demultiplexing circuit would be adapted as a consequence.

I claim:

1. Apparatus for obtaining by absorption of infrared rays the concentration of a given gas present in a mixture of gasses to be analyzed, comprising: an infrared ray source, for emitting infrared radiation; an analysis chamber adapted to contain the mixture, and disposed in the path of the radiation emitted by said source; a modulator for periodically interposing in the path of said radiation a gaseous reference filter which absorbs the characteristic lines of the given gas and a measurement filter which does not absorb these lines; a non-selective detection cell disposed to receive the radiation after is has been modulated and after it has passed through the analysis chamber, said detection cell delivering electric signals in response to the radiation that it receives; and electronic circuits for processing the electric signals delivered by the cell; wherein the said filters of the modulator are separated from one another by two identical base filters comprising an element permitting grey transmission slightly lower than the average transmission of said reference filter so that the cell delivers successively a measurement signal and a reference signal respectively defined with respect to a common level determined by said base filters; and wherein said electronic processing circuits comprise means for amplifying and demultiplexing said signals, and means for establishing and reading out the quotient of said measurement signal and said reference signal, said quotient being representative only of the concentration sought.

2. Gas analyzer apparatus according to claim 1, wherein the base filters comprise, in addition to an element permitting grey transmission, a gaseous filter identical to said reference filter.

3. Modulator for the apparatus according to claim 1 comprises a sealed annular chamber containing the particular gas sought, this chamber being constituted between two parallel superimposed plates in an annulus of a material transparent to infred and then polished, said chamber being divided into four sectors, the first sector being occupied by a piece having polished parallel faces which is cut from the same material, this first sector constituting said measurement filter, the second and third sectors being diametrically opposed and comprising on one of the plates spots opaque to infrared, these second and third sectors constituting said base filters, and the fourth sector being free and constituting the reference filter.

4. Modulator according to claim 3, wherein the opaque spots are serigraphic.

5. Modulator according to claim 3, wherein the radial edges of the transparent pieces having parallel faces disposed in the annular chambers are perpendicular to said faces and well polished.

6. Modulator according to claim 3, wherein a small angular sector without spots is provided between each radial edge of said pieces having parallel faces and the edges of the base sectors contiguous to said edges.

7. Modulator according to claim 3, wherein each of the concentric walls of the annular chambers comprise at least one circular or helical groove occupying a width approximately equal to the height of said chambers, with a mat black coating applied to said walls.

8. Modulator according to claim 3, wherein annular plates forming the chambers bear against shoulders formed on the one hand at the exterior of a hub and/or at least of a ring engaged on said hub, and on the other hand at the interior of rims superimposed and stacked one in another, the various elements of said modulator being rigidly secured to one another by blueing.

9. Modulator according to claim 12, wherein certain chambers have a height substantially greater than the thickness of the transparent pieces disposed in said chambers.

10. Apparatus for obtaining by absorption of infrared rays the respective concentrations of a number N of given gasses present in a mixture to be analyzed, comprising, in combination: a source of infrared rays; an analysis chamber adapted to contain said mixture and disposed in the path of the rays emitted by said source; a modulator for periodically interposing in the path of the rays, a gaseous reference filter absorbing the totality of the characteristic lines of said N given gasses and N gaseous measurement filters each corresponding to a particular given gas and absorbing respectively the characteristic lines of all the given gasses other than the lines of said particular gas; said (N + 1) gaseous filters being separated from one another by (N + 1) identical base filters comprising an element permitting grey transmission slightly lower than the average transmission of said reference filter; a non-selective detection cell disposed to receive the modulated rays that have passed through the analysis chamber, said detection cell successively delivering, in response to the rays that it receives, N measurement signals and a reference signal respectively defined with respect to a common base level; electronic circuits for processing said signals to a common base level; electronic circuits for processing said signals comprising means for amplifying and demultiplexing said signals and means for establishing and reading out the quotients of said N measurement signals and said reference signal, said quotients being respectively representative of only the concentrations sought.

11. Gas analyzer apparatus according to claim 10, wherein the base filters comprise, in addition to an element permitting grey transmission, a gaseous filter identical to said reference filter.

12. Modulator for the device according to claim 10 comprising N sealed annular chambers adapted to contain respectively said N gasses sought, said N chambers being constituted by (N + 1) parallel superimposed plates cut in an annulus of a material transparent to infrared and then polished, the modulator being divided into 2 (N + 1) sectors which constitute respectively the N measurement filters, the reference filter and the (N + 1) base filters, said N measurement filters comprising N pieces having polished parallel faces and which are cut in the same material and are respectively disposed in said N chambers, said (N + 1) base filters comprising on a given plate (N + 1) sectors covered with spots opaque to infrared, said reference filter being constituted by the free sector.

13. Modulator according to claim 12, wherein the radial edges of the transparent pieces having parallel faces disposed in the annular chambers are perpendicular to said faces and well polished.

14. Modulator according to claim 12, wherein a small angular sector without spots is provided between each radial edge of said pieces having parallel faces and edges of the base sectors contigous to said edges.

15. Modulator according to claim 12, wherein each of the concentric walls of the annular chambers comprise at least one circular or helical groove occupying a width approximately equal to the height of said chambers, with a mat black coating applied to said walls.

16. Modulator according to claim 12, wherein the annular plates forming the chambers bear against shoulders formed on the one hand at the exterior of a hub and/or at least of a ring engaged on said hub, and on the other hand at the interior of rims superimposed and stacked one in another, the various elements of said modulator being rigidly secured to one another by glueing.

17. Apparatus according to claim 1, wherein the means for applying the measurement signal and the reference signal comprise an amplifier whose gain is variable under the action of a control voltage, and a loop for regulating the amplitude of the demultiplexed reference signal, incorporating said variable gain amplifier, is provided so that the demultiplexed measurement signal obtained is directly the quotient sought.

18. Apparatus according to claim 10, wherein the means for amplifying the measurement signals and the reference signal comprise an amplifier whose gain is variable under the action of a control voltage, and a loop for regulating the amplitude of the demultiplexed reference signal, incorporating said variable gain amplifier, is provided so that the demultiplexed measurement signals obtained are directly the quotients sought.

* * * * *